(No Model.)

A. W. HAMAKER.
BRAKE LEVER.

No. 314,331. Patented Mar. 24, 1885.

Witnesses.
A. Ruppert.
H. A. Daniels

Inventor.
A. W. Hamaker.
Thomas P. Simpson.
Attorney.

UNITED STATES PATENT OFFICE.

AARON W. HAMAKER, OF MOUNDSVILLE, WEST VIRGINIA.

BRAKE-LEVER.

SPECIFICATION forming part of Letters Patent No. 314,331, dated March 24, 1885.

Application filed January 24, 1885. (No model.)

*To all whom it may concern:*

Be it known that I, A. W. HAMAKER, of Moundsville, in the county of Marshall and State of West Virginia, have invented an Improved Wagon-Brake Lever, of which the following is a specification.

The special object of the invention is to facilitate, simplify, and render certain the action of the brake mechanism on a wagon. The means by which I accomplish my purpose will first be described in connection with the drawings, and then clearly pointed out in the claims.

Figure 1:
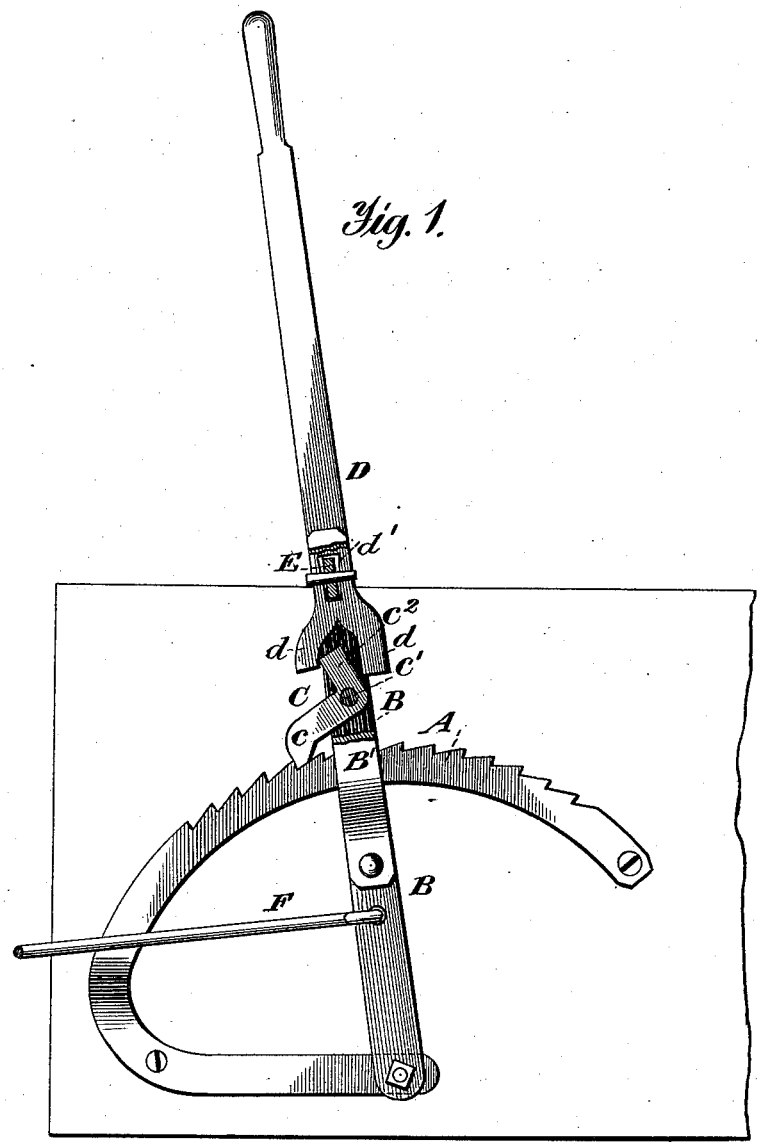
Figure 2:
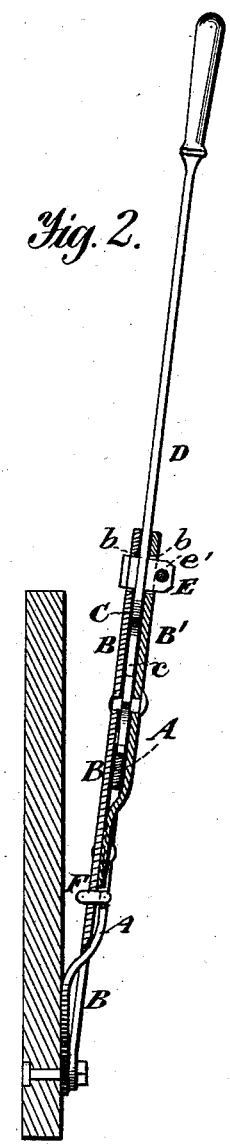

Figure 1 of the drawings is a side elevation showing all the parts placed together in their proper local relation to each other. Fig. 2 is a vertical sectional elevation showing the relative construction of the lower end of the hand-lever with respect to the detent-lever, and of its bearing with respect to the key, upon which it has a slight play or vibration.

In the drawings, A represents the ordinary curved rack-bar, which is attached to the wagon-body in any suitable manner, and B the lever, which carries a detent to catch in one of the teeth of rack-bar in order to hold the brake-shoes against the wheels.

My detent C has the usual catch-arm, $c$, on one side of its fulcrum $c'$, and on the other side an arm, $c^2$, the detent being pivoted between lever B and a plate, B', which is secured rigidly thereto, but so as to leave free space between them for the rack-bar A, detent C, and hand-lever D. The latter is provided at the lower end with two forks, $d\,d$, between which goes the detent-arm $c^2$.

The parts B B' are made with the two corresponding slots, $b\,b$, near their upper ends, and in these slots snugly fit the flat rivet E, which has a head at one end, and serves to co-operate with a pin, bolt, or rivet, which passes crosswise through a hole, $e'$, of the rivet.

It will be observed that the hand-lever D forces the detent into the teeth of the rack-bar, which is a matter of importance. The forks of this lever are of unequal length, and the longest fork strikes against detent a little above the center of rivet, so that when the driver pushes the upper part of handle-lever forward the tension on lever B will cause the long fork to push down the detent into the teeth of rack-bar. It will thus be seen that the pressure upon the brake is uniform, according to the amount of force which it is desired to apply and the particular tooth of the rack-bar behind which the detent is made to catch.

The detent is made perfectly certain in its action, and is so held that a slip is practically impossible, while the ease with which the driver manipulates the brake and regulates the exact force to be applied is wonderful.

In order to give the lever D sufficient play to hold and press the arm $c^2$ in opposite directions, so as to lock or unlock the lever B, I make the slot $d'$ to diverge on both sides from its bottom to its top, as clearly shown in Fig. 1 of the drawings.

F represents the connection between the brake-lever and the mechanism for operating the shoe.

The force to be exerted on the wheels is greater or less, according to the distance that the lever B is carried rearwardly.

It will be observed that my brake-lever consists really of three levers—the detent, the lever that carries it, and the lever that operates it. The driver, by a very slight movement of his hand, may put on or take off the brake, and so little physical exertion is required that a boy can operate the brake as well as a man.

Having thus described all that is necessary to a full understanding of my invention, what I consider new, and desire to protect by Letters Patent, is—

1. The hand-lever D, having a slot, $d'$, widening from bottom to top, in combination with a flat rivet, E, connecting the two parts B B', as and for the purpose described.

2. The hand-lever D, made with a fork at the lower end, and embracing an angle arm, $c^2$, of the detent C, to enable the lever not only to unlock, but to hold detent down to the rack and to prevent the brake from being unlocked by jolts and jars before the bottom of a hill is reached.

AARON W. HAMAKER.

Witnesses:
C. W. WICKHAM,
GEO. RUPP.